US007663698B2

(12) United States Patent
Hara

(10) Patent No.: US 7,663,698 B2
(45) Date of Patent: Feb. 16, 2010

(54) GENLOCK DEVICE HAVING LOG AND ALARM FUNCTIONS

(75) Inventor: Tomomi Hara, Yokohama (JP)

(73) Assignee: Leader Electronics Corporation, Yokohoma-shi, Kanagawa-ken (JP)

( * ) Notice: Subject to any disclaimer, the term of this patent is extended or adjusted under 35 U.S.C. 154(b) by 738 days.

(21) Appl. No.: 11/275,573

(22) Filed: Jan. 17, 2006

(65) Prior Publication Data

US 2006/0176402 A1      Aug. 10, 2006

(30) Foreign Application Priority Data

Feb. 4, 2005   (JP) .............................. 2005-029661

(51) Int. Cl.
*H04N 9/475* (2006.01)
(52) U.S. Cl. ...................... 348/516; 348/512
(58) Field of Classification Search .......... 348/500–551
See application file for complete search history.

(56) References Cited

U.S. PATENT DOCUMENTS 4,769,691 A * 9/1988 Dischert ..................... 348/505

5,598,219 A * 1/1997 Furuya et al. ............... 348/465

FOREIGN PATENT DOCUMENTS

JP           10-191099           7/1998

* cited by examiner

*Primary Examiner*—M. Lee
(74) *Attorney, Agent, or Firm*—Fish & Richardson P.C.

(57) ABSTRACT

A genlock device comprises: means (31) for inputting an external reference signal; means (32,33,34,36,39,40,41,42, 44) for generating a master reference clock signal synchronized in phase with the external reference signal; and means (37) for storing a genlock state. The genlock state includes, for example, absence of a synchronization signal in the external reference signal. The genlock device can further comprise: means (45) for storing a voltage value determined so that a voltage controlled oscillator (40) oscillates a signal having a frequency higher or lower by a predetermined value than a reference frequency of the voltage controlled oscillator; and means (44) for judging whether a voltage value which controls the voltage controlled oscillator is larger or smaller than the voltage value.

7 Claims, 4 Drawing Sheets

19: 2004/12/15 14:02:30 UNDER +10ppm,[525i/59.94]
18: 2004/12/15 14:01:14 WARNNING! OVER +10ppm,[525i/59.94]
17: 2004/12/15 14:01:04 LOCKED(EXT),[525i/59.94]
16: 2004/12/15 14:01:03 LOCKED(FLYWHEEL),[525i/59.94]]
15: 2004/12/15 14:01:02 BURST ABSENT,[NO SIGNAL]
14: 2004/12/15 13:55:50 LOCKED(EXT),[NTSC BB]
13: 2004/12/15 13:51:24 LOCKED(FLYWHEEL),[NO SIGNAL]
12: 2004/12/15 13:51:23 SYNC ABSENT,[NO SIGNAL]
11: 2004/12/15 13:46:05 LOCKED(EXT),[NTSC BB]
10: 2004/12/15 13:45:50 MODE CHANGE,[AUTO(FLYWHEEL)]
9: 2004/12/15 13:37:22 LOCKED(EXT),[NTSC BB]
8: 2004/12/15 13:37:20 SYNC ABSENT,[INT]
7: 2004/12/15 13:34:48 LOCKED(EXT),[525i/59.94]
6: 2004/12/15 13:34:45 BURST ABSENT[INT]
5: 2004/12/15 13:05:07 LOCKED(EXT),[NTSC BB]
4: 2004/12/15 13:01:23 SYNC ABSENT,[INT]
3: 2004/12/15 12:48:12 LOCKED(EXT),[NTSC BB+Ref+ID]
2: 2004/12/15 12:35:43 SYNC ABSENT,[INT]
1: 2004/12/15 12:34:56 POWER ON,MODE[AUTO(GO INTERNAL)]

*Fig. 4*

GENLOCK DEVICE HAVING LOG AND ALARM FUNCTIONS

BACKGROUND OF THE INVENTION

The present invention generally relates to genlock (GENERATION LOCK) devices and, more particularly, to a genlock device having a function for storing a genlock state and/or a function for judging and alerting the genlock state.

A genlock device is incorporated in various apparatuses which perform video processing etc. and are disposed in, for example, a studio in a broadcast station, an outside broadcast van, or the like.

FIG. 1 is a diagram for schematically explaining a genlock system and FIG. 2 is a schematically functional block diagram of a video signal generator 12.

As shown in FIG. 1, the genlock system includes a reference signal generator 11, video signal generators 12 and 13, and a terminator 14. The reference signal generator 11 generates a reference signal (for example, NTSC black burst (BB) signal: EXT_REF), and the reference signal (EXT_REF) is inputted to both of the video signal generators 12 and 13. Each of the video signal generators 12 and 13 generates a video signal synchronized with the reference signal (EXT_REF) and outputs it. Thus, since the video signal outputted from each of the video signal generators 12 and 13 is synchronized to the common reference signal (EXT_REF), it is convenient to process the video signal to merge images outputted from the video signal generators 12 and 13.

As shown in FIG. 2, the video signal generator 12 includes a genlock device 21 and a video signal processing device 22. The genlock device 21 inputs the reference signal (EXT_REF), generates a master reference clock signal (MAS_REF_CLK) synchronized with the reference signal (EXT_REF), and outputs it. The video signal processing device 22 generates an image signal synchronized with the reference signal (EXT_REF) based on the master reference clock signal (MAS_REF_CLK) and outputs it.

In addition, a video signal generator similar to the video signal generator 12 shown in FIG. 2 is disclosed in, for example, Japanese Patent Application Laid-Open (JP-A) No. 10-191099 (FIG. 13).

SUMMARY OF THE INVENTION

When the reference signal (EXT_REF) from the reference signal generator 11 is inputted to the video signal generators 12 and 13 via coaxial cable, there is a case where the reference signal (EXT_REF) is interrupted because of some reasons, or influenced by an external noise. In such a case, as a result, the genlock system is adversely affected.

An object of the present invention is to provide a genlock device, which can comprehend phenomena affecting a genlock system.

Another object of the present invention is to provide a genlock device having a function for storing a genlock state.

A further object of the present invention is to provide a genlock device having a function for judging and alerting a genlock state.

A still further object of the present invention will become apparent to a person skilled in the art by referring to the scope of the invention, embodiments of the invention described below, and the attached drawings.

A genlock device according to the present invention comprises means for inputting an external reference signal; means for generating a master reference clock signal synchronized in phase with the external reference signal; and means for storing a genlock state.

The genlock device can further comprise means for detecting absence of a synchronization signal in the external reference signal, wherein the genlock state includes the absence of the synchronization signal in the external reference signal.

The genlock device can further comprise means for detecting absence of a burst signal in the external reference signal, wherein the genlock state includes the absence of the burst signal in the external reference signal.

The genlock device can further comprise means for detecting a format of the external reference signal, wherein the genlock state includes the format of the external reference signal.

The genlock state can include that the master reference clock signal is synchronized in phase with the external reference signal.

The genlock device can further comprise means for oscillating an internal reference signal; and means for generating a master reference clock signal synchronized in phase with the internal reference signal, wherein the genlock state includes that the master reference clock signal is synchronized in phase with the internal reference signal.

The genlock state can include a genlock operation mode. The means for storing the genlock state can store the genlock state together with the present date and time. The means for generating the master reference clock signal synchronized in phase with the external reference signal can comprise a voltage controlled oscillator. The genlock device can further comprise means for storing a first voltage value determined so that the voltage controlled oscillator oscillates a signal having a frequency higher by a predetermined value than a reference frequency of the voltage controlled oscillator; and means for judging whether or not a voltage value which controls the voltage controlled oscillator is larger than the first voltage value. The genlock state can include that the master reference clock signal synchronized in phase with the external reference signal exceeds an upper limit allowance.

The genlock device can further comprise means for storing a second voltage value determined so that the voltage controlled oscillator oscillates a signal having a frequency lower by a predetermined value than the reference frequency of the voltage controlled oscillator; and means for judging whether or not the voltage value which controls the voltage controlled oscillator is smaller than the second voltage value. The genlock state can include that the master reference clock signal synchronized in phase with the external reference signal exceeds a lower limit allowance.

The genlock device can comprise means for displaying that the master reference clock signal synchronized in phase with the external reference signal exceeds the upper limit allowance. The genlock device can include means for displaying that the master reference clock signal synchronized in phase with the external reference signal exceeds the lower limit allowance.

BRIEF DESCRIPTION OF THE DRAWINGS

FIG. 4 is an example of log contents stored in memory means 47.

DETAILED DESCRIPTION OF THE INVENTION

Embodiments of the present invention will be described below; however, the present invention is not limited to these embodiments. Further, those skilled in the art can easily carry out the present invention defined by the scope of the invention by modifying the following embodiments.

Figure 1:
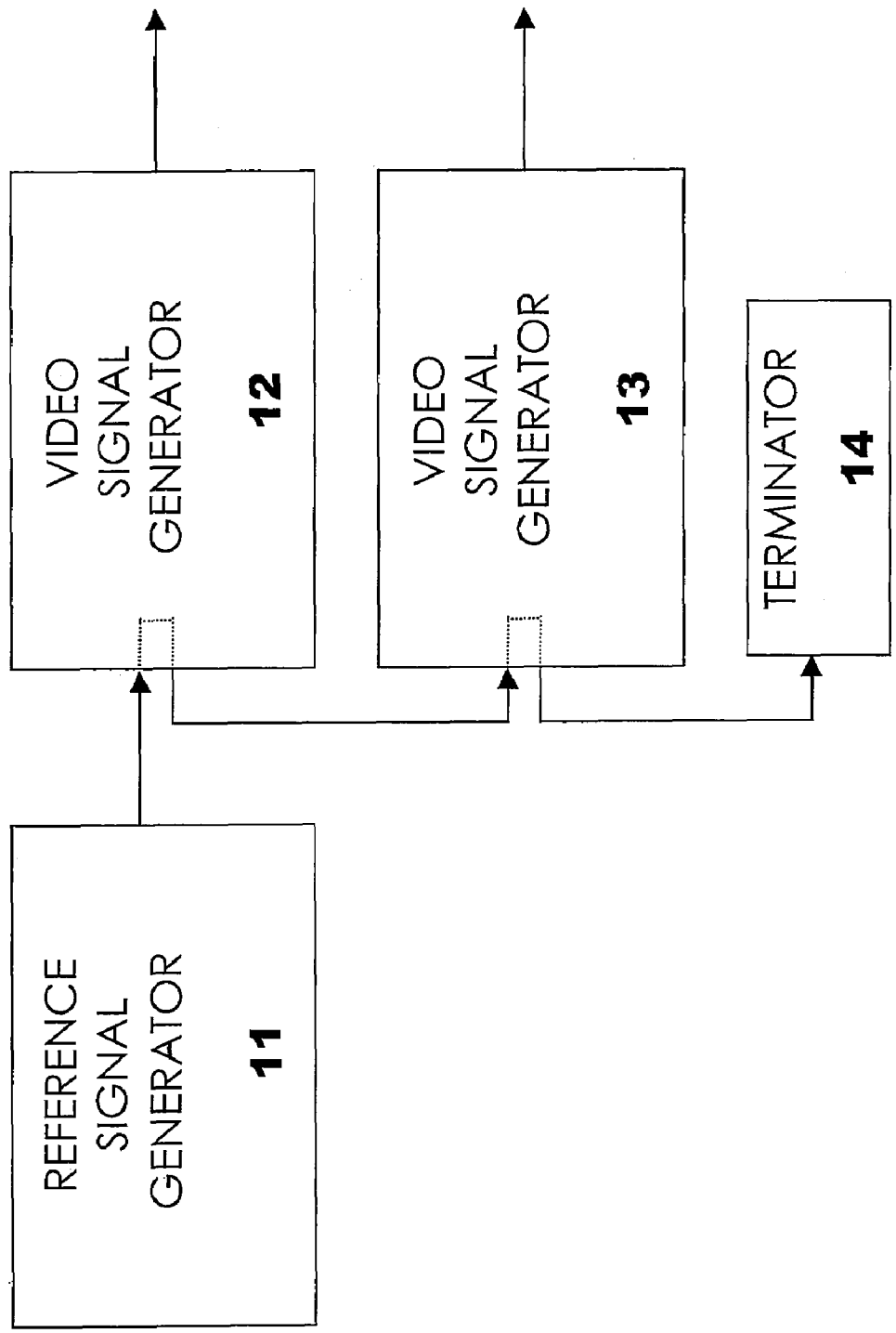
FIG. 1 is a diagram for schematically explaining a genlock system.
Figure 2:
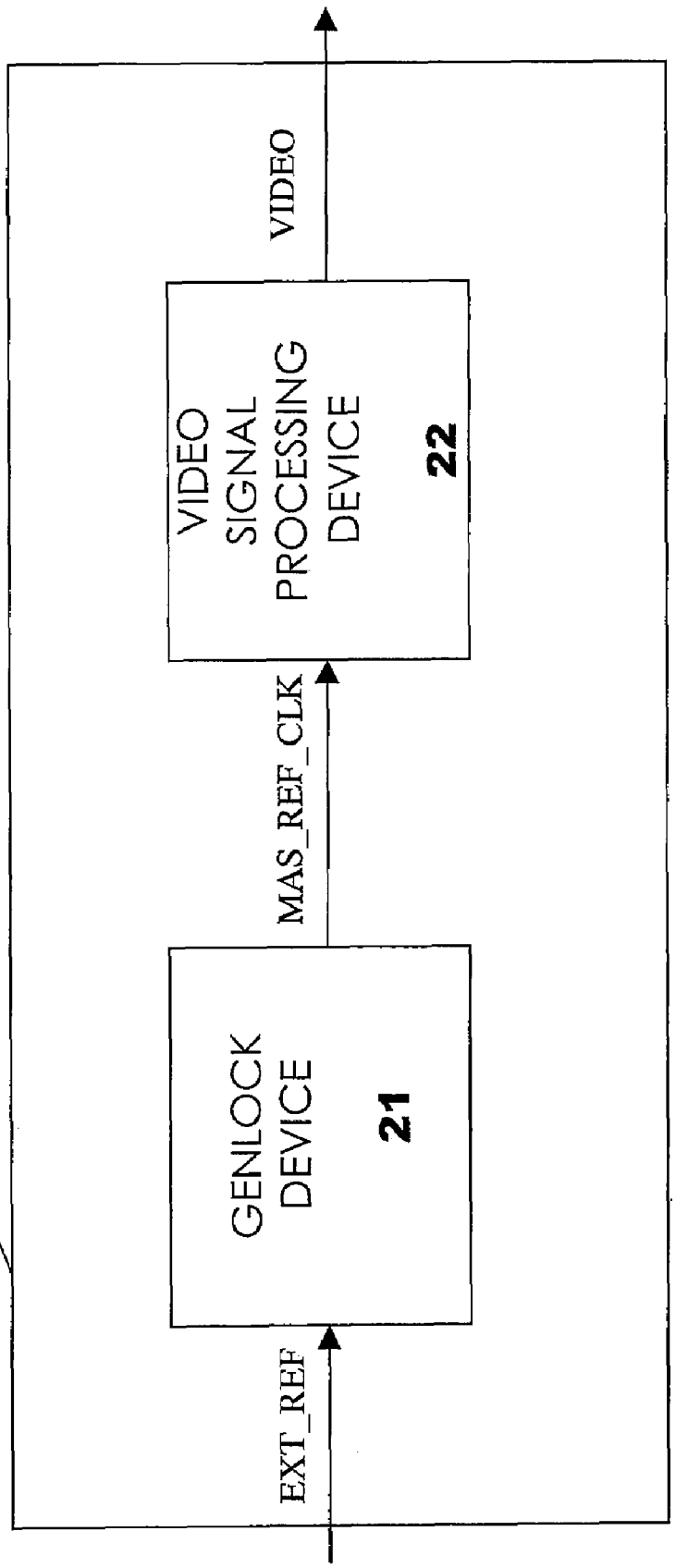
FIG. 2 is a schematically functional block diagram of a video signal generator 12.
Figure 3:
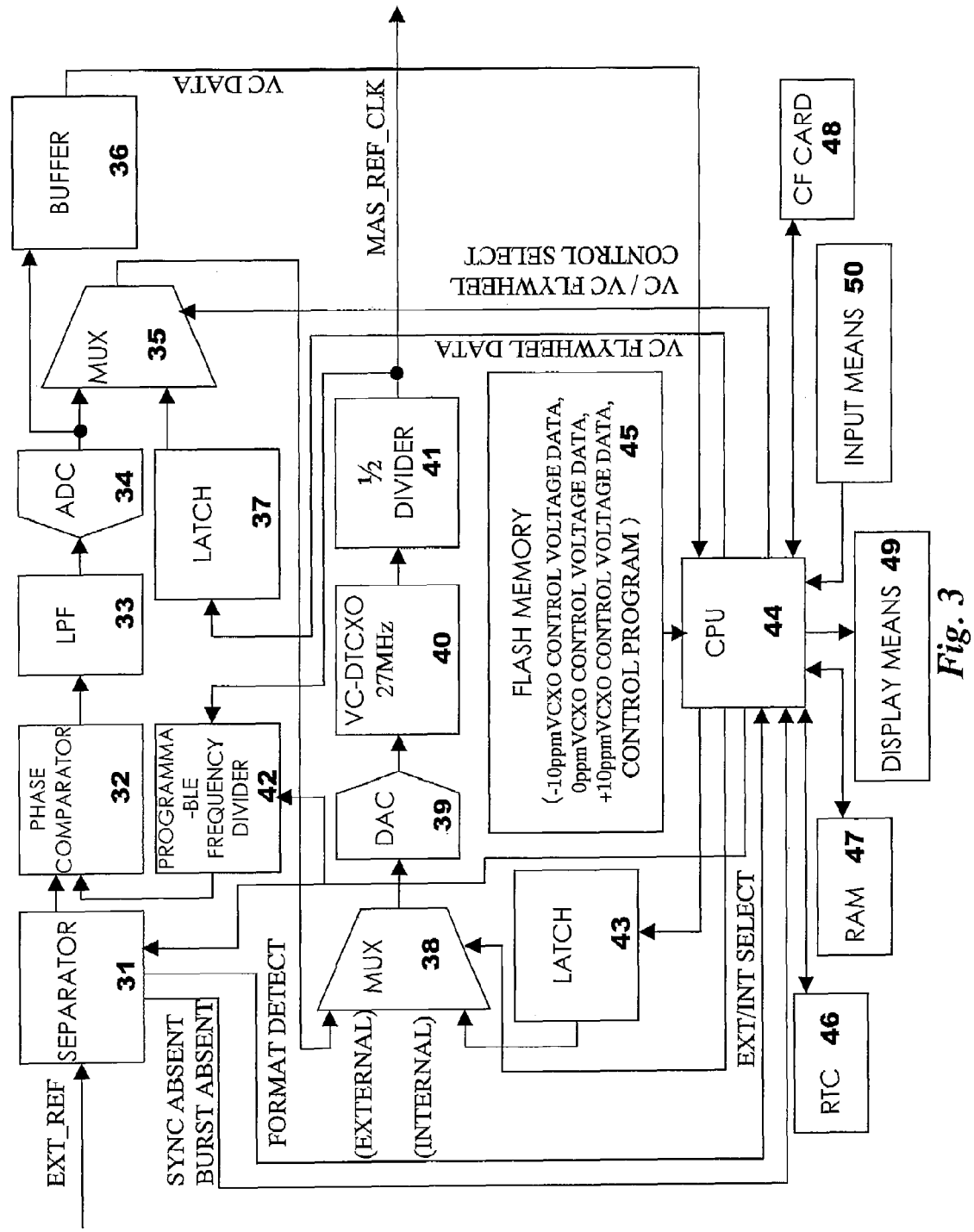
FIG. 3 is a detailed block diagram of a genlock device 21 according to the present invention.

FIG. 3 is a detailed block diagram of a genlock device 21 according to the present invention. The genlock device 21 shown in FIG. 3 comprises both an external synchronization mode and an internal synchronization mode. The external synchronization mode is a mode where the genlock device generates a master reference clock signal synchronized in phase with a reference signal (EXT_REF) from a reference signal generator 11. The internal synchronization mode is a mode where the genlock device generates a master reference clock signal synchronized in phase with a reference signal (INT_REF) generated inside the genlock device 21. Further, the external synchronization mode includes a mode (FLY-WHEEL) where the genlock device 21 generates a master reference clock signal synchronized in phase with the reference signal (EXT_REF) just before to be absent in a case that the reference signal (EXT_REF) from the reference signal generator 11 has been absent.

A synchronization signal separator 31 inputs the reference signal (EXT_REF) from the reference signal generator 11 and judges whether or not a synchronization signal is included in the reference signal. In a case where the synchronization signal is included in the reference signal, the synchronization signal separator 31 separates the synchronization signal from the reference signal.

In the case where the synchronization signal is not included in the reference signal, the synchronization signal separator 31 generates a signal showing absence of the synchronization signal and outputs the signal (SYNC_ABSENT) to a CPU 44. In this case, the synchronization signal separator 31 outputs no signals to a phase comparator 32.

In the case where the synchronization signal is included in the reference signal, the synchronization signal separator 31 further judges whether or not a burst signal is included in the reference signal. In the case where the burst signal is not included in the reference signal, the synchronization signal separator 31 generates a signal showing absence of the burst signal and outputs the signal (BURST_ABSENT) to the CPU 44.

In the case where the synchronization signal is included in the reference signal, the synchronization signal separator 31 further detects a format of the reference signal and outputs a signal (FORMAT_DETECT) showing the detected format to the CPU 44.

The synchronization signal separator 31 separates the synchronization signal from the reference signal, and then, in accordance with instructions from the CPU 44, directly outputs the separated synchronization signal to the phase comparator 32; alternatively divides a frequency of the separated synchronization signal, generates a signal suitable for an input of the phase comparator 32, and outputs it to the phase comparator 32. Note that the instructions from the CPU 44 are to divide a frequency by a predetermined frequency dividing ratio (including 1/1), not to divide a frequency, etc. More specifically, for example, when the reference signal is a reference signal in line with SD (Standard Definition) standard, the CPU 44 directly outputs the separated synchronization signal to the phase comparator 32. Further, when the reference signal is a reference signal (1080i/59.94) in line with HD (High Definition) standard, the CPU 44 divides the frequency of the separated synchronization signal into 1/15 and outputs it to the phase comparator 32. Furthermore, when the reference signal is a reference signal (1080i/50) in line with the HD standard, the CPU 44 divides the frequency of the separated synchronization signal into 1/9 and outputs it to the phase comparator 32.

The phase comparator 32 inputs the synchronization signal (including the frequency-divided synchronization signal) from the synchronization signal separator 31. Further, the phase comparator 32 inputs a signal oscillated from a voltage controlled oscillator 40 via a programmable frequency divider 42. The phase comparator 32 compares phases of two inputted signals and outputs a signal showing a phase difference to a low pass filter 33.

The low pass filter 33 eliminates a high frequency component of the signal inputted from the phase comparator 32 and outputs it to an AD converter 34.

The AD converter 34 converts a voltage of the signal inputted from the low pass filter 33 to a digital value and outputs it to a multiplexer 35 and a buffer 36.

The multiplexer 35 inputs the digital value from the AD converter 34. Further, multiplexer 35 inputs a digital value held by a latch 37. The multiplexer 35 inputs a signal for selecting either one of the two inputted digital values from the CPU 44. The multiplexer 35 switches the two inputted digital values in accordance with the selection signal, and outputs either of the two values to a multiplexer 38.

More specifically, for example, when the multiplexer 35 inputs a signal (Vc SELECT) for selecting a digital value of the AD converter 34, the multiplexer 35 outputs the digital value from the AD converter 34 to the multiplexer 38. Further, when the multiplexer 35 inputs a signal (Vc FLYWHEEL CONTROL SELECT) for selecting the digital value of the latch 37, the multiplexer 35 outputs the digital value held by the latch 37 to the multiplexer 38.

The buffer 36 stores the digital value from the AD converter 34. Note that the digital value to be stored in the buffer 36 is read out by the CPU 44.

The latch 37 holds the digital value for implementing the FLYWHEEL mode and outputs it to the multiplexer 35. Note that the digital value to be stored in the latch 37 is written by the CPU 44.

The multiplexer 38 inputs the digital value from the multiplexer 35. Further, the multiplexer 38 inputs a digital value held by a latch 43. The multiplexer 38 inputs a signal for selecting either one of the two inputted digital values from the CPU 44. The multiplexer 38 switches the two inputted digital values in accordance with the selection signal, and outputs it to a DA converter 39.

More specifically, for example, when the multiplexer 38 inputs a signal (EXT SELECT) for selecting a digital value of the multiplexer 35, the multiplexer 38 outputs the digital value from the multiplexer 35 to the DA converter 39. Further, when the multiplexer 38 inputs a signal (INT SELECT) for selecting the digital value of the latch 43, the multiplexer 38 outputs the digital value held by the latch 43 to the DA converter 39.

The DA converter 39 converts the digital value inputted from the multiplexer 38 to an analog voltage, and outputs it to the voltage controlled oscillator 40.

The voltage controlled oscillator 40 oscillates a signal having a constant frequency in accordance with the analog voltage from the DA converter 39, and outputs it to a frequency divider 41.

The frequency divider 41 outputs a signal, the signal having a frequency which is obtained by dividing the frequency of the signal inputted from the voltage controlled oscillator 40 by a predetermined value, to the programmable frequency divider 42. The predetermined value is, for example, 2. The signal generated by the frequency divider 41 is an output signal of the genlock device 21 of the present invention, and is outputted from the genlock device 21 to the video signal processing device 22 as the master reference clock signal (MAS_REF_CLK). In addition, the frequency divider 41 may be omitted; in this case, a signal outputted from the voltage controlled oscillator 40 is the master reference clock signal (MAS_REF_CLK).

The programmable frequency divider 42 outputs a signal, the signal having a frequency which is obtained by dividing the frequency of the signal inputted from the frequency divider 41 by a predetermined value, to the phase comparator 32. The predetermined number is determined by the CPU 44 based on the signal (FORMAT_DETECT) showing the detected format so that there is no phase difference between the two signals to be inputted to the phase comparator 32.

In the external synchronization mode, since the two signals to be inputted to the phase comparator 32 are synchronized in phase with each other, the synchronization signal included in the reference signal (EXT_REF) is synchronized in phase with the master reference clock signal (MAS_REF_CLK).

The latch 43 holds a digital value for controlling the voltage controlled oscillator 40 in the internal synchronization mode, and outputs it to the multiplexer 38. Note that the digital value to be held in the latch 37 is written by the CPU 44, and the digital value is determined so that the voltage controlled oscillator 40 oscillates a signal having a reference frequency (for example, 27 MHz) of the voltage controlled oscillator 40.

Memory means 45 (for example, a flash memory) stores a determined digital value so that the voltage controlled oscillator 40 oscillates the signal having the reference frequency (for example, 27 MHz) of the voltage controlled oscillator 40. Further, the memory means 45 can store a determined digital value so that the voltage controlled oscillator 40 oscillates a signal having a frequency (for example, 27.000270 MHz) higher by a predetermined value (for example, 10 ppm of the reference frequency) than the reference frequency (for example, 27 MHz). Furthermore, the memory means 45 can store a determined digital value so that the voltage controlled oscillator 40 oscillates a signal having a frequency (for example, 26.999730 MHz) lower by a predetermined value than the reference frequency. In addition, the memory means 45 stores a program for controlling the CPU 44.

The CPU 44 reads out the program stored in the memory means 45 and carries out the following operation in accordance with the program. Note that data showing at least one genlock operation mode is stored in memory means 47 (for example, RAM). The genlock operation mode is composed of five operation modes, for example. A first operation mode (INTERNAL) is a mode where a genlock is always carried out with an internal synchronization mode. A second operation mode (AUTO (GO INTERNAL)) is a mode where a genlock is carried out with an external synchronization mode irrespective of a format of an external reference signal (EXT_REF), and is carried out with an internal synchronization mode when the external reference signal has been absent. A third operation mode (MANUAL (GO INTERNAL)) is a mode where a genlock is carried out with an external synchronization mode in the case that an external reference signal corresponds to a format designated by a user, and is carried out with an internal synchronization mode in the case other than the before-mentioned case. A fourth operation mode (AUTO (FLYWHEEL)) is a mode where a genlock is carried out with an external synchronization mode irrespective of a format of an external reference signal, and is carried out using the external reference signal just before to be absent when the reference signal has been absent. A fifth operation mode (MANUAL (FLYWHEEL)) is a mode where a genlock is carried out with an external synchronization mode in the case where an external reference signal corresponds to a format designated by a user is inputted, and is carried out using the external reference signal just before to be absent when the reference signal has been absent.

Further, data showing whether or not an alarm function is enabled is also stored in the memory means 47. Furthermore, data showing whether or not a log function is enabled is also stored in the memory means 47. In the following description, it is assumed that data showing the second operation mode (AUTO (GO INTERNAL)), data showing that the alarm function is enabled, and data showing the log function is enabled are in advance stored in the memory means 47. Further, it is assumed that the reference signal (EXT_REF) from the reference signal generator 11 is not inputted into the synchronization signal separator 31.

The CPU 44 starts up in accordance with the program, and reads out data (data showing the second operation mode (AUTO (GO INTERNAL)), data showing that the alarm function is enabled, and data showing the log function is enabled) stored in the memory means 47, together with obtaining the present date and time (for example, 2004/12/15 12:34:56) with reference to a real time clock 46. After that the CPU 44 outputs the signal (Vc SELECT) for selecting the digital value of the AD converter 34 to the multiplexer 35 in order to prepare the second operation mode. Further, the CPU 44 enables the alarm function and log function. The CPU 44 outputs a signal showing that the genlock device 21 has started up and showing the genlock operation mode, to display means 49. The display means 49 displays, for example, "POWER ON, MODE [AUTO (GO INTERNAL)]." Since the log function is enabled, the CPU 44 stores the contents shown in the display means 49, as well as the date and time corresponding to the contents, in the memory means 47.

Note that the CPU 44 outputs the signal (EXT SELECT) for selecting the digital value of the multiplexer 35 in order to enable the external synchronization mode to the multiplexer 38. Further, the CPU 44 prepares the internal synchronization mode. That is, the CPU 44 reads out a digital value to make the voltage controlled oscillator 40 oscillate a signal having the reference frequency (for example, 27 MHz) from the memory means 45, and outputs it to the latch 43. Furthermore, in order to prepare the alarm function, the CPU 44 reads out two digital values from the memory means 45 to make the voltage controlled oscillator 40 oscillate signals having frequencies (for example, 27.000270 MHz and 26.999730 MHz) which are higher or lower by a predetermined frequency than the reference frequency (for example, 27 MHz).

Since the reference signal from the reference signal generator 11 is not inputted into the synchronization signal separator 31, the CPU 44 accepts the signal (SYNC_ABSENT) showing that the synchronization signal is not included from the synchronization signal separator 31, and also obtains the present date and time (for example, 2004/12/15 12:35:43) with reference to the real time clock 46. After that, in order to enable the internal synchronization mode, the CPU 44 outputs the signal (INT SELECT) for selecting the digital value of the latch 43 to the multiplexer 38. Further, the CPU 44 outputs a signal showing the absence of the synchronization signal and showing the internal synchronization mode, to the display means 49. The display means 49 displays "SYNC ABSENT, [INT]," for example. The CPU 44 stores the contents shown in the display means 49, as well as the date and time corresponding to the contents, in the memory means 47.

After that, it is assumed that the reference signal (synchronization signal of an NTSC system, the signal in which a burst signal, field reference signal, and 10 field ID signal are multiplexed; and a video signal is not multiplexed) from the reference signal generator 11 is inputted to the synchronization signal separator 31. When the CPU 44 accepts a signal (FORMAT_DETECT) showing the detected format from the synchronization signal separator 31, it outputs a signal (EXT SELECT) for selecting the digital value of the multiplexer 35 to the multiplexer 38 in order to enable the external synchronization mode. The CPU 44 obtains the present date and time (for example, 2004/12/15 12:48:12), together with obtaining information that there is no phase difference between two signals to be inputted to the phase comparator 32 by reading out the buffer 36. Further, the CPU 44 outputs a signal showing that the master reference clock signal synchronized in phase with the reference signal (EXT_REF), and showing the format of the reference signal (synchronization signal of the NTSC system, the signal in which a burst signal, field reference signal, and 10 field ID signal are multiplexed; and a video signal is not multiplexed), to the display means 49. The display means 49 displays "LOCKED (EXT), [NTSC BB+Ref+ID]," for example. Note "NTSC BB" denotes a NTSC black burst signal (synchronization signal of the NTSC system, the signal in which a burst signal is multiplexed and a video signal is not multiplexed); "Ref" denotes that the field reference signal is multiplexed; and "ID" denotes that the 10-field ID signal is multiplexed. The CPU 44 stores the contents shown in the display means 49, as well as the date and time corresponding to the contents, in the memory means 47. In addition, since the alarm function is enabled, the CPU 44 periodically reads out the digital value stored in the buffer 36 while the master reference clock signal is synchronized in phase with the reference signal (EXT_REF). The CPU 44 further judges whether or not the digital value from the buffer 36 is larger than the digital value to make the voltage controlled oscillator 40 oscillate a signal having a frequency (for example, 27.000270 MHz) which is higher by a predetermined value than the reference frequency; and also judges whether or not the digital value from the buffer 36 is smaller than the digital value to make the voltage controlled oscillator 40 oscillate a signal having a frequency (for example, 26.999730 MHz) which is lower by a predetermined value than the reference frequency.

After that, it is assumed that the reference signal from the reference signal generator 11 is not inputted to the synchronization signal separator 31. The CPU 44 accepts the signal (SYNC_ABSENT) showing absence of the synchronization signal from the synchronization signal separator 31, and also obtains the present date and time (for example, 2004/12/15 13:01:23). After that, the CPU 44 enables the internal synchronization mode. Further, the CPU 44 outputs a signal showing the absence of the synchronization signal and showing the genlock state, to the display means 49. The display means 49 displays "SYNC ABSENT, [INT]," for example. The CPU 44 stores the contents shown in the display means 49, and the date and time corresponding to the contents, in the memory means 47.

After that, it is assumed that the reference signal from the reference signal generator 11 (synchronization signal of the NTSC system, the signal in which a burst signal is multiplexed and a video signal is not multiplexed (=black burst signal of the NTSC system)) is inputted to the synchronization signal separator 31. When the CPU 44 accepts the signal showing the detected format from the synchronization signal separator 31, it enables the external synchronization mode. The CPU 44 obtains the present date and time (for example, 2004/12/15 13:05:07), together with obtaining information that there is no phase difference between two signals to be inputted to the phase comparator 32 by reading out the buffer 36. Further, the CPU 44 outputs a signal showing that the master reference clock signal is synchronized in phase with the reference signal (EXT_REF) and showing the signal for showing the format of the reference signal format (black burst signal of the NTSC system), to the display means 49. The display means 49 displays "LOCKED (EXT), [NTSC BB]," for example. The CPU 44 stores the contents shown in the display means 49, and the date and time corresponding to the contents, in the memory means 47. In addition, since the alarm function is enabled, the CPU 44 periodically compares the digital value from the buffer 36 with each digital value from the memory means 45 while the master reference clock signal is synchronized in phase with the reference signal (EXT_REF).

After that, it is assumed the burst signal is not included in the synchronization signal. The CPU 44 obtains the present date and time (for example, 2004/12/15 13:34:45), together with accepting a signal (BURST_ABSENT) showing absence of the burst signal from the synchronization signal separator 31. After that the CPU 44 enables the internal synchronization mode. Further, the CPU 44 outputs a signal showing the absence of the burst signal as well as the genlock state, to the display means 49. The display means 49 displays "BURST ABSENT, [INT]," for example. The CPU 44 stores the contents shown in the display means 49, and the date and time corresponding to the contents, in the memory means 47.

At this time, even when the burst signal is not included in the synchronization signal, there exists the synchronization signal. That is, the reference signal from the reference signal generator 11 is a synchronization signal in line with an interlace system, where the total number of scanning lines is 525, and the frame frequency is 59.94 Hz. Thereafter, the synchronization signal separator 31 detects the format of the inputted reference signal. When the CPU 44 accepts the signal showing the detected format from the synchronization signal separator 31, it enables the external synchronization mode. The CPU 44 obtains the present date and time (for example, 2004/12/15 13:34:48), together with obtaining information that there is no phase difference between two signals to be inputted to the phase comparator 32 by reading out the buffer 36. Further, the CPU 44 outputs a signal showing that the master reference clock signal is synchronized in phase with the reference signal (EXT_REF) and showing the format of the reference signal (the synchronization signal in line with the interlace system, where the total number of scanning lines is 525 and the frame frequency is the synchronization signal of 59.94 Hz), to the display means 49. The display means 49 displays "LOCKED (EXT), [525i/59.94]," for example. The CPU 44 stores the contents shown in the display means 49, and the date and time corresponding to the contents, in the memory means 47. In addition, since the alarm function is enabled, the CPU 44 periodically compares the digital value from the buffer 36 with each digital value from the memory means 45.

After that, it is assumed that the reference signal from the reference signal generator 11 is not inputted to the synchronization signal separator 31. The CPU 44 accepts a signal (SYNC_ABSENT) showing absence of the synchronization signal from the synchronization signal separator 31, and also obtains the present date and time (for example, 2004/12/15

13:37:20). After that, the CPU 44 enables the internal synchronization mode. Further, the CPU 44 outputs a signal showing that there is no synchronization signal, and showing the genlock state, to the display means 49. The display means 49 displays "SYNC ABSENT, [INT]," for example. The CPU 44 stores the contents shown in the display means 49, and the date and time corresponding to the contents, in the memory means 47.

After that, it is assumed that the reference signal (black burst signal of the NTSC system) from the reference signal generator 11 is inputted to the synchronization signal separator 31. When the CPU 44 accepts a signal showing the detected format from the synchronization signal separator 31, it enables the external synchronization mode. The CPU 44 obtains the present date and time (for example, 2004/12/15 13:37:22), together with obtaining information that there is no phase difference between the two signals to be inputted to the phase comparator 32 by reading out the buffer 36. Further, the CPU 44 outputs a signal showing that the master reference clock signal is synchronized in phase with the reference signal (EXT_REF) and showing the format of the reference signal (black burst signal of the NTSC system), to the display means 49. The display means 49 displays "LOCKED(EXT), [NTSC BB]," for example. The CPU 44 stores the contents shown in the display means 49, and the date and time corresponding to the contents, in the memory means 47. In addition, since the alarm function is enabled, the CPU 44 periodically compares the digital value from the buffer 36 with each digital value from the memory means 45.

After that, it is assumed that the genlock operation mode is changed to the fourth operation mode. The CPU 44 inputs from input means 50 the fourth operation mode changed by a user, and enables the fourth operation mode, together with obtaining the present date and time (for example, 2004/12/15 13:45:50). Further, the CPU 44 stores data showing the fourth operation mode, in the memory means 47. Furthermore, the CPU 44 outputs a signal showing that the genlock operation mode is changed, and showing the genlock operation mode, to the display means 49. The display means 49 displays "MODE CHANGE, MODE [AUTO (FLYWHEEL)]," for example.

The CPU 44 obtains the present date and time (for example, 2004/12/15 13:46:05), together with obtaining information that there is no phase difference between the two signals to be inputted to the phase comparator 32 by reading out the buffer 36. Further, the CPU 44 outputs a signal showing that the master reference clock signal is synchronized in phase with the reference signal (EXT_REF) again, and showing the format of reference signal (black burst signal of the NTSC system), to the display means 49. The display means 49 displays "LOCKED (EXT), [NTSC BB]," for example. The CPU 44 stores the contents shown in the display means 49, and the date and time corresponding to the contents, in the memory means 47. In addition, since the alarm function is enabled, the CPU 44 periodically compares the digital value from the buffer 36 with each digital value from the memory means 45.

After that, it is assumed that the reference signal from the reference signal generator 11 is not inputted to the synchronization signal separator 31. The CPU 44 accepts a signal (SYNC_ABSENT) showing the absence of the synchronization signal from the synchronization signal separator 31, and also obtains the present date and time (for example, 2004/12/15 13:51:23). The CPU 44 outputs the signal showing the absence of the synchronization signal to the display means 49. The display means 49 displays "SYNC ABSENT, [NO SIGNAL]," for example. The CPU 44 stores the contents shown in the display means 49, and the date and time corresponding to the contents, in the memory means 47.

After that, the CPU 44 outputs the digital value read out from the buffer 36 just before accepting the signal (SYNC_ABSENT) showing the absence of the synchronization signal, to the latch 37. Furthermore, the CPU 44 outputs the signal (Vc FLYWHEEL CONTROL SELECT) for selecting the digital value of the latch 37 to the multiplexer 35, and also obtains the present date and time (for example, 2004/12/15 13:51:24). The CPU 44 outputs a signal showing that the master reference clock signal is synchronized in phase with the reference signal (EXT_REF) just before to be absent, and showing the absence of the reference signal, to the display means 49. The display means 49 displays "LOCKED (FLYWHEEL), [NO SIGNAL]," for example. The CPU 44 stores the contents shown in the display means 49, and the date and time corresponding to the contents, in the memory means 47.

After that, it is assumed that the reference signal (black burst signal of the NTSC system) from the reference signal generator 11 is inputted into the synchronization signal separator 31. When the CPU 44 accepts a signal showing the detected format from the synchronization signal separator 31, it outputs a signal (Vc SELECT) for selecting the digital value of the AD converter 34 to the multiplexer 35. The CPU 44 obtains the present date and time (for example, 2004/12/15 13:55:50), together with obtaining information that there is no phase difference between the two signals to be inputted to the phase comparator 32 by reading out the buffer 36. Further, the CPU 44 outputs a signal showing that the master reference clock signal is synchronized in phase with the reference signal (EXT_REF) and showing the reference signal format (black burst signal of the NTSC system), to the display means 49. The display means 49 displays "LOCKED (EXT), [NTSC BB]," for example. The CPU 44 stores the contents shown in the display means 49, and the date and time corresponding to the contents, in the memory means 47. In addition, since the alarm function is enabled, the CPU 44 periodically compares the digital value from the buffer 36 with each digital value from the memory means 45.

After that, it is assumed the burst signal is not included in the synchronization signal. The CPU 44 obtains the present date and time (for example, 2004/12/15 14:01:02), together with accepting a signal (BURST_ABSENT) showing the absence of the burst signal from the synchronization signal separator 31. The CPU 44 outputs a signal showing the absence of the burst signal to the display means 49. The display means 49 displays "BURST ABSENT, [NO SIGNAL]," for example. The CPU 44 stores the contents shown inthe display means 49, and the date and time corresponding to the contents, in the memory means 47.

At this time, even the burst signal is not included in the synchronization signal, there exists the synchronization signal. That is, the reference signal from the reference signal generator 11 is a synchronization signal in line with an interlace system, where the total number of scanning lines is 525 and the frame frequency is 59.94 Hz. Thereafter, the synchronization signal separator 31 detects the format of the inputted reference signal.

The CPU 44 outputs the digital value read out from the buffer 36 just before accepting the signal (BURST_ABSENT) showing the absence of the burst signal, to the latch 37. Furthermore, the CPU 44 outputs a signal (Vc FLYWHEEL CONTROL SELECT) for selecting the digital value of the latch 37 to the multiplexer 35, and also obtains the present date and time (for example, 2004/12/15 14:01:03). Further, the CPU 44 accepts a signal showing the detected format from the synchronization signal separator 31. The CPU 44 outputs a signal showing that the master reference clock signal is synchronized in phase with the reference signal (EXT_REF) just before to be absent, and showing the format of the detected reference signal, to the display means 49. The display means 49 displays "LOCKED (FLY-WHEEL), [525i/59.94]," for example. The CPU 44 stores the contents shown in the display means 49, and the date and time corresponding to the contents, in the memory means 47.

When the CPU 44 accepts a signal showing the detected format from the synchronization signal separator 31, it outputs a signal (Vc SELECT) for selecting the digital value of the AD converter 34 to the multiplexer 35. The CPU 44 obtains the present date and time (for example, 2004/12/15 14:01:04), together with obtaining information that there is no phase difference between two signals to be inputted to the phase comparator 32 by reading out the buffer 36. Further, the CPU 44 outputs a signal showing that the master reference clock signal is synchronized in phase with the reference signal (EXT_REF), and showing the format of the reference signal (the synchronization signal in line with the interlace system, where the total number of scanning lines is 525 and the frame frequency is 59.94 Hz), to the display means 49. The display means 49 displays "LOCKED (EXT), [525i/59.94]," for example. The CPU 44 stores the contents shown in the display means 49, and the date and time corresponding to the contents, in the memory means 47. In addition, since the alarm function is enabled, the CPU 44 periodically compares the digital value from the buffer 36 with each digital value from the memory means 45.

After that, it is assumed that the digital value from the buffer 36 exceeds a range defined by each digital value from the memory means 45. When the CPU 44 judges that the digital value from the buffer 36 is larger than the digital value which is determined so that the voltage controlled oscillator 40 oscillates a signal having a higher frequency by a predetermined value (for example, 27.000270 MHz) than the reference frequency, it obtains the present date and time (for example, 2004/12/15 14:01:14). Preferably, when the digital value from the buffer 36 exceeds the range defined by each digital value from the memory means 45 during a predetermined period (for example, 10 seconds) or longer, the CPU 44 judges that the digital value from the buffer 36 is larger than the digital value from the memory means 45, and obtains the present date and time.

Further, the CPU 44 outputs a signal-showing that the master reference clock signal exceeds the upper limit allowance and is synchronized in phase with the reference signal (EXT_REF), and showing the format of the reference signal format (the synchronization signal in line with the interlace system, where the total number of scanning lines is 525 and the frame frequency is 59.94 Hz), to the display means 49. The display means 49 displays "WARNING! OVER+10 ppm, [525i/59.94]," for example. The CPU 44 stores the contents shown in the display means 49, and the date and time corresponding to the contents, in the memory means 47. In addition, since the alarm function is enabled, the CPU 44 continuously compares the digital value from the buffer 36 with each digital value from the memory means 45. Note that the display means 49 may be implemented by lighting or blinking of a LED, showing alarm, in place of displaying characters, showing alarm.

After that, it is assumed that the digital value from the buffer 36 returns within the range defined by each digital value from the memory means 45. When the CPU 44 judges that the digital value from the buffer 36 is smaller than the digital value which is determined so that the voltage controlled oscillator 40 oscillates a signal having a higher frequency by a predetermined value (for example, 27.000270 MHz) than the reference frequency, it obtains the present date and time (for example, 2004/12/15 14:02:30). Preferably, when the digital value from the buffer 36 returns within the range defined by each digital value from the memory means 45 during a predetermined period (for example, 10 seconds) or longer, the CPU 44 judges that the digital value from the buffer 36 is smaller than the digital value from the memory means 45, and obtains the present date and time.

Further, the CPU 44 outputs a signal showing that the master reference clock signal is within the upper limit allowance and synchronized in phase with the reference signal (EXT_REF), and for showing the format of the reference signal (the synchronization signal in line with the interlace system, where the total number of scanning lines is 525 and the frame frequency is 59.94 Hz), to the display means 49. The display means 49 displays "UNDER+10 ppm, [525i/59.94]," for example. The CPU 44 stores the contents shown in the display means 49, and the date and time corresponding to the contents, in the memory means 47. In addition, since the alarm function is enabled, the CPU 44 continuously compares the digital value from the buffer 36 with each digital value from the memory means 45.

FIG. 4 is an example of log contents stored in memory means 47. As shown in FIG. 4, the above-described genlock states are stored in the memory means 47, together with the log generation number. In addition, in consideration of the capacity of the memory means 47, the log generation number may be set to 99, for example. That is, the memory means 47 may store 99 genlock states. The CPU 44 may erase the genlock state of the oldest log generation number, whenever it stores the genlock state after the 100th in the memory means 47.

When the CPU 44 inputs a log retention mode designated by a user from the input means 50, it stores the log contents stored in the memory means 47 in a storage medium 48 (for example, CF CARD).

Further, when the CPU 44 inputs a log display mode designated by a user from the input means 50, it displays the log contents stored in the memory means 47 in the display means 49. In addition, in consideration of the display area of the display means 49, the display means 49 can display the genlock state for every log generation number.

According to the present invention, a state of an external reference synchronization signal can be comprehended, and therefore, what defects and when the defects are generated in the external reference synchronization signal can be analyzed.

What is claimed is:

1. A genlock device comprising:
 means for inputting an external reference signal;
 means for generating a master reference clock signal synchronized in phase with the external reference signal;
 means for storing a genlock state; and
 means for detecting absence of a synchronization signal in the external reference signal;
 wherein the genlock state includes the absence of the synchronization signal in the external reference signal.

2. A genlock device comprising:
 means for inputting an external reference signal;
 means for generating a master reference clock signal synchronized in phase with the external reference signal;
 means for storing a genlock state; and
 means for detecting absence of a burst signal in the external reference signal;
 wherein the genlock state includes the absence of the burst signal in the external reference signal.

3. A genlock device comprising:
means for inputting an external reference signal;
means for generating a master reference clock signal synchronized in phase with the external reference signal;
means for storing a genlock state; and
means for detecting a format of the external reference signal;
wherein the genlock state includes the format of the external reference signal.

4. A genlock device comprising:
means for inputting an external reference signal;
means for generating a master reference clock signal synchronized in phase with the external reference signal; and
means for storing a genlock state,
wherein the means for generating the master reference clock signal performing phase synchronization with the external reference signal comprises a voltage controlled oscillator, the genlock device further comprising: means for storing a first voltage value determined so that the voltage controlled oscillator oscillates a signal having a frequency higher by a predetermined value than a reference frequency of the voltage controlled oscillator; and means for judging whether or not a voltage value which controls the voltage controlled oscillator is larger than the first voltage value; and wherein the genlock state includes that the master reference clock signal synchronized in phase with the external reference signal exceeds an upper limit allowance.

5. A genlock device comprising:
means for inputting an external reference signal;
means for generating a master reference clock signal synchronized in phase with the external reference signal; and
means for storing a genlock state,
wherein the means for generating the master reference clock signal performing phase synchronization with the external reference signal comprises a voltage controlled oscillator, the genlock device further comprising: means for storing a second voltage value determined so that the voltage controlled oscillator oscillates a signal having a frequency lower by a predetermined value than a reference frequency of the voltage controlled oscillator; and means for judging whether or not a voltage value which controls the voltage controlled oscillator is smaller than the second voltage value; and wherein the genlock state includes that the master reference clock signal synchronized in phase with the external reference signal exceeds a lower limit allowance.

6. A genlock device comprising: means for inputting an external reference signal; means for generating a master reference clock signal synchronized in phase with an external reference signal, the generating means including a voltage controlled oscillator; means for storing a first voltage value determined so that the voltage controlled oscillator oscillates a signal having a frequency higher by a predetermined value than a reference frequency of the voltage controlled oscillator; means for judging whether or not a voltage value which controls the voltage controlled oscillator is larger than the first voltage value; and means for displaying that the master reference clock signal synchronized in phase with the external reference signal exceeds an upper limit allowance.

7. The genlock device according to claim 6, further comprising:
means for storing a second voltage value determined so that the voltage controlled oscillator oscillates a signal having a frequency higher by a predetermined value than the reference frequency of the voltage controlled oscillator; means for judging whether or not the voltage value which controls the voltage controlled oscillator is smaller than the second voltage value; and means for displaying that the master reference clock signal synchronized in phase with the external reference signal exceeds a lower limit allowance.

\* \* \* \* \*

UNITED STATES PATENT AND TRADEMARK OFFICE
CERTIFICATE OF CORRECTION

PATENT NO.       : 7,663,698 B2                           Page 1 of 1
APPLICATION NO.  : 11/275573
DATED            : February 16, 2010
INVENTOR(S)      : Tomomi Hara It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1067 days.

Signed and Sealed this

Twenty-eighth Day of December, 2010

David J. Kappos
*Director of the United States Patent and Trademark Office*